Figure 1:
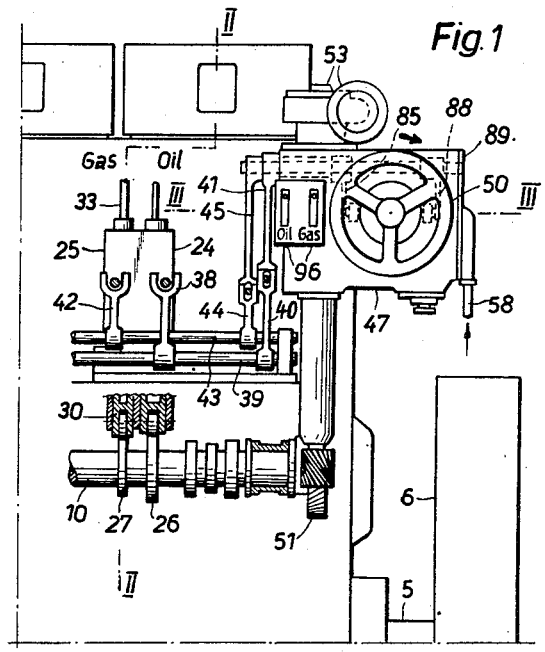

March 15, 1960  H. R. HUG  2,928,382
DUAL FUEL INTERNAL COMBUSTION ENGINE
Filed Oct. 6, 1958  3 Sheets-Sheet 1

INVENTOR:
Hans Rudolf Hug
by Wenderoth, Lind & Ponack
Attys.

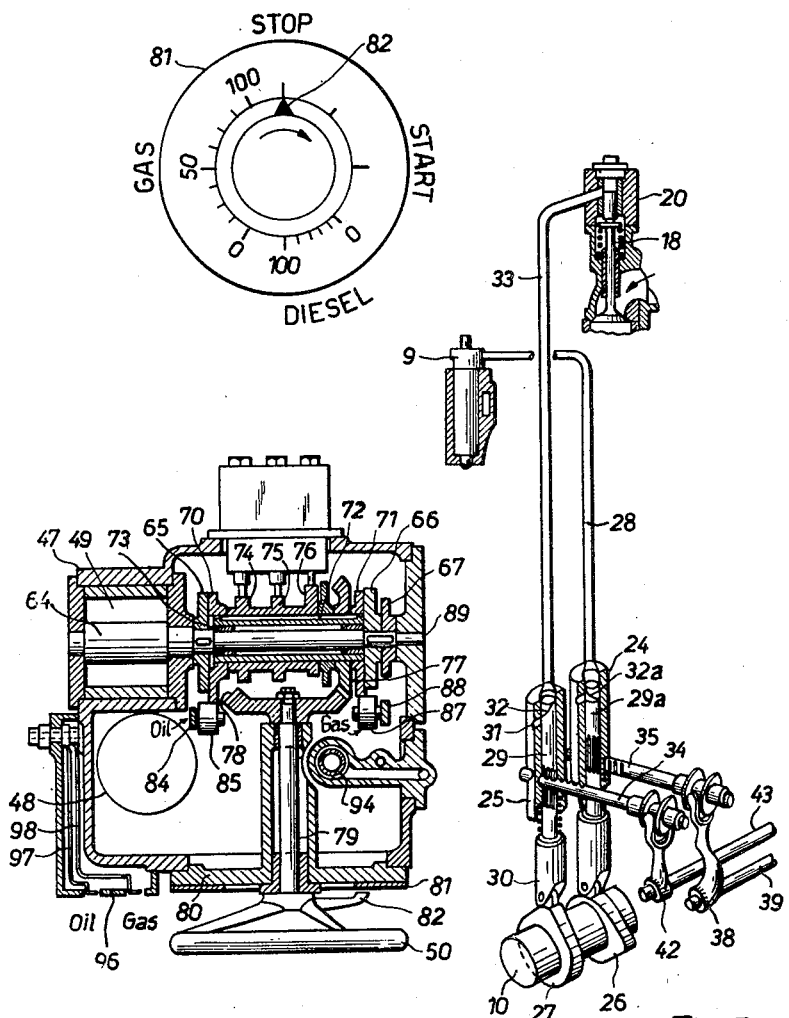

March 15, 1960  H. R. HUG  2,928,382
DUAL FUEL INTERNAL COMBUSTION ENGINE
Filed Oct. 6, 1958  3 Sheets-Sheet 3

INVENTOR:
Hans Rudolf Hug
by Wenderoth, Lind & Ponack
Attys.

United States Patent Office 2,928,382
Patented Mar. 15, 1960

2,928,382

DUAL FUEL INTERNAL COMBUSTION ENGINE

Hans Rudolf Hug, Winterthur, Switzerland, assignor to Schweizerische Lokomotiv- und Maschinenfabrik, Winterthur, Switzerland Application October 6, 1958, Serial No. 765,410

Claims priority, application Switzerland October 10, 1957

6 Claims. (Cl. 123—27)

This invention relates to dual fuel internal combustion engines which operate on liquid fuel according to the diesel method and at the same time on gaseous fuel according to the ignition jet method, and in which the admission of both fuel components can be regulated manually as well as by a governor. In prior internal combustion engines of the kind described the proportion between the liquid fuel and the gaseous fuel is preset to a certain value, for example 2:3. During operation of the engine the governor keeps the proportion at this constant value. According to other control method the available gas fuel proportion is completely used during the whole range of operation and liquid fuel is only injected, when the required engine output is not yet attained.

These known control methods are not suitable for many applications, especially when the amount and the quality of the available gas is irregular.

The principal object of the invention is the provision of a dual fuel internal combustion engine in which the available gas fuel proportion is not completely used with increasing load, but in which the maximum amount of gas fuel admitted duing a certain period of operation is arbitrarily set by the operator, preferably by means of the hand control wheel of the engine. This adjustment of the fuel admission can be made not only when the engine is at a standstill, but also when it is running.

According to the present invention the dual fuel internal combustion engine comprises control equipment including manually operable means adapted to adjust the maximum proportion of the gas fuel available for a period of operation during standstill or during running of the engine, and governor actuated means controlling the gas fuel admission until the preset maximum gas fuel admission is reached and upon higher engine load demands automatically effecting additional admission by delivery of liquid fuel to the engine.

The advantage of the engine control system according to the invention becomes obvious when for example considering the operation of a wood gas generator. It is well known, that at the beginning of the operation of a wood gas generator, the produced gas is of minor quality. When such gas is delivered to the dual fuel engine in a large proportion right from the beginning of the operation of the gas generator, gas of poor quality will be burned in the engine, with the effect, that carbonizing and sooting of the cylinders and other undesirable effects occur. Therefore, it will be of advantage, at the beginning of the wood gas generator operation, to admit a small proportion of gas fuel to the engine, i.e. to adjust the gas consumption of the engine to the operating condition of the gas generator or other source of gas. The same is true, according to the newest experiences, when using for example blast furnace gases as gas fuel for the operation of a dual fuel engine.

Figure 2:
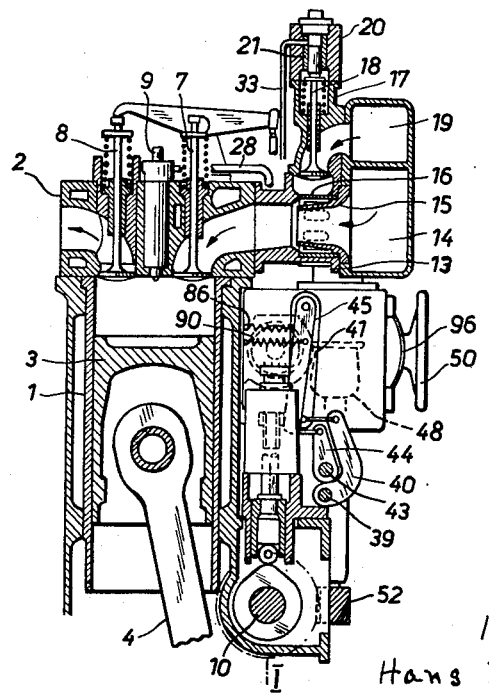
Figure 6:
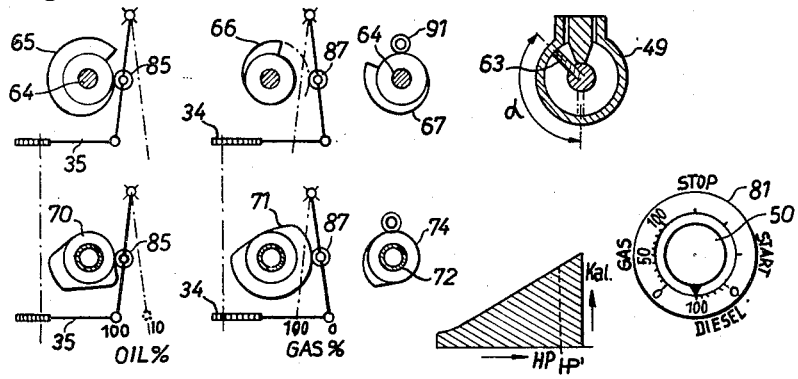
Figure 7:
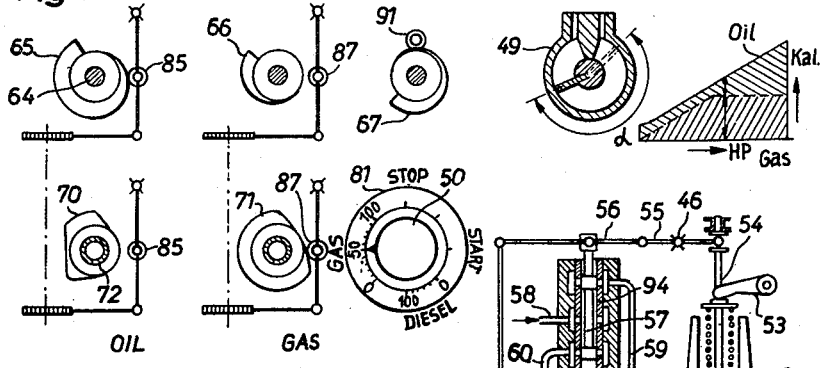
Figure 8:
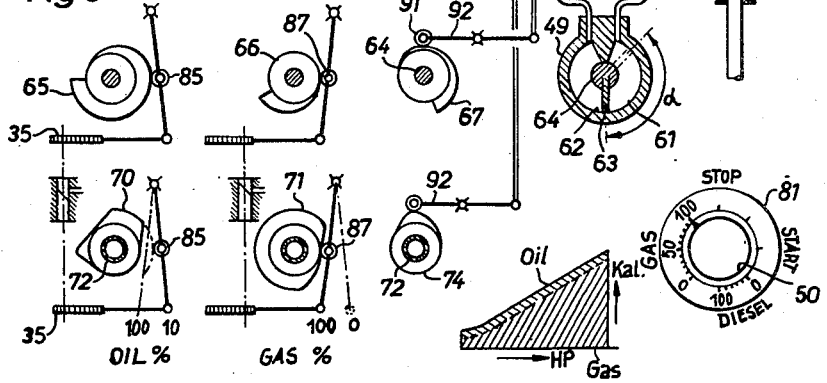

An embodiment of the invention is illustrated by the accompanying drawings, in which Figure 1 is a side elevation of a dual fuel engine according to the invention, Figure 2 is a vertical section on the line II—II of Figure 1, Figure 3 is a horizontal section through the control casing of the engine along the line III—III of Figure 1, Figure 4 is a view of the position disc located behind the hand wheel in Figures 1 and 3, Figure 5 shows the fuel pump and the gas inlet valve actuating pump, partly in section and partly in perspective view, Figures 6, 7 and 8 show diagrammatically three different positions of the regulating means.

Figures 1 and 2 illustrate a fragmentary portion of a four cycle internal combustion engine, having a cylinder 1, a cylinder cover 2, a piston 3, a piston rod 4, a crank shaft 5, a fly wheel 6, an inlet valve 7, an exhaust valve 8, a fuel injection nozzle 9 and a camshaft 10.

Inlet and mixing means for air and gas are visible in Figure 2 on the right hand side of the cylinder cover 2. Each cylinder has its own mixing housing 13 which is fixed to the cylinder cover 2 and connected to the air manifold 14 which feeds combustion air to all cylinders. The housing 13 comprises an air nozzle 15 and a mixing tube 16; a valve casing 17 for the gas inlet valve 18 is mounted on the housing 13. The valve casing 17 is laterally connected to the gas supply manifold 19. Accordingly, the means for mixing air and gas immediately follows the gas flow controlling means and is formed as concentric ejector comprising an inner air nozzle; this design facilitates the mixing of air and gas. The gas valve 18 is actuated by pressure fluid for which purpose a cylinder 20 with a piston 21 is provided on the housing 17.

For controlling the liquid and the gaseous fuel admission, each cylinder has its own control means (Fig. 5). The fuel injection pump 24 and the gas valve actuating pump 25 of each cylinder are actuated by the cams 26, 27 of the cam shaft 10. The fuel injection pump 24 is connected by a conduit 28 to the injection nozzle 9, which is used not only for the injection of liquid fuel when the engine operates solely according to the diesel method, but also for the delivery of the ignition oil when the engine operates on dual fuel. During the suction stroke the gas cam 27 causes a lifting of the piston 29 by means of the cam follower 30. When the inclined control edge 32 closes the inlet bore 31 the piston 29 delivers pressure oil through the conduit 33 and opens the gas valve 18. The piston 29 can be rotated by the rack 34 within certain limits, so that the inclined control edge 32 closes the inlet bore 31 sooner or later or not at all. Accordingly more or less or no pressure oil is delivered to the cylinder 20, and the degree of opening of the gas valve 18 is dependent on the amount of pressure oil delivered into the cylinder 20. The gas valve actuating pump accordingly operates in similar manner as the fuel injection pump 24, which is controlled as is well known by an inclined edge 32a of the piston 29a which is rotated by a rack 35. Both the fuel injection pump and the gas valve actuating pump are mounted in a common housing 25a (Fig. 1). The racks 34 and 35 are connected to the regulating device by levers and rods 38, 39, 40, 41 and 42, 43, 44, 45, respectively.

The regulating and control casing 47 (Fig. 3) houses an automatic operating control unit comprising a governor 48, a rotary servo motor 49, the governor linkage and the control fluid conduits. Disposed in the same casing is also a control unit actuated by the handwheel 50.

The cam shaft 10 drives the centrifugal governor 48 belonging to the first mentioned control unit, by the intermediary of screw wheels 51, 52. The rated speed of the centrifugal governor 48 is adjusted by the speed adjusting device 53 (Fig. 1) rotation of which moves arm 53a to adjust the tension of the spring on governor 48 (Fig. 8). As shown in the diagram in Figure 8 the regulating movements produced by the centrifugal weights of the governor 48 are transmitted by the governor spindle 54 and the levers 55, 56 to the control slides 57 of the servo-motor 49, the lever 55 having a fixed pivot 46. According to the movement imparted to the slide 57, this latter connects the oil inlet duct 58 either to the conduit 59 or the conduit 60 leading to one or the other of the chambers 61 or 62 of the servomotor 49. The rotary slide 63 then transmits its angular movement to the shaft 64 of the servomotor. An "oil" cam 65 controlling the oil injection, a "gas" cam 66 controlling the gas admission, and a resetting cam 67 are keyed to the extended shaft 64 of the servomotor. In order to facilitate the easy removal, the shaft 64 is journalled in removable housing covers (Fig. 3).

The second control unit for the manual control comprises an "oil" cam 70 controlling the oil injection and a "gas" cam 71 controlling the gas admission. These cams are keyed on a hollow shaft 72 which is rotatably mounted on the shaft 64 of the servomotor by means of bushings 73. Three auxiliary control cams, i.e. a change-over cam 74, a main gas valve cam 75 and a start lubrication cam 76 are located between the two main cams 70, 71 and are also keyed to the hollow shaft 72. The unit also comprises a bevel gear 77 meshing with another bevel gear 78. The latter is keyed to the inner end of the hand wheel shaft 79 which is journalled in the housing cover 80 and can be easily removed. A position disc 81 is fixed to the cover 80 and has engraved therein the main positions of the hand wheel 50, namely "Stop," "Start," "Diesel" and "Gas." The two latter positions are subdivided by a graduation from 0 to 100. The hand wheel 50 having a position indicator 82 is represented as a heavy circular line in Figure 4. It is in the position "Stop," in which the engine is completely shut down.

The manually controlled oil cam 70 is located adjacent the automatically controlled oil cam 65. A common cam follower 85 mounted on a lever 84 is applied against both cams. The lever 84 is rigidly connected by a tube to the already mentioned lever 41 mounted on the outside of the control casing. A spring 86 acting on this lever tends to constantly apply the cam follower 85 against one of the two cams 65, 70 so that the control movements are transmitted by means of the rack 35 (Figure 5) to the piston of the fuel injection pump 24. In analogous manner a common cam follower 87 is provided for the manually controlled gas cam 71 and the automatically controlled gas cam 66, and is connected to a lever 88, itself connected to the lever 45 (Figure 2), which is acted upon by a spring 90. This lever transmits the control motions to the rod 43, the rack 34 and the piston 29 of the gas valve actuating pump 25.

The manner of operation and control of the engine is explained with reference to Figures 6, 7 and 8, in which the regulating means are shown in three main positions. At the right hand side of each figure is shown the position set by operation of the hand wheel 50, while the left hand side shows the cams 70, 71 and 74, which are rotated by operation of the wheel 50, in their respective angular positions. The upper part of these figures represents the instantaneous angular positions of the servomotor 49 and of the three cams 65, 66 and 67 mounted on shaft 64 of the servomotor. The diagrams shown in each of these Figures 6, 7 and 8 represent the relation between the amounts of heat derived from the fuel components employed, namely the amount of heat derived from the liquid fuel and that derived from the gaseous fuel, as a function of the total output (HP) of the engine.

Figure 6 refers to the operation with liquid fuel exclusively. The hand wheel 50 has been turned from the "Stop"-position over "pre-lubrication" and "Start" positions first to the "0" graduation mark of "Diesel" position which corresponds to the idle running, the engine being first kept under the control of the centrifugal governor. Afterwards the hand wheel is moved further to the "100" graduation line of "Diesel" position. In this manner the engine has been started and is operating with liquid fuel only; it now can supply, if desired, the maximum diesel power. By operation of the hand wheel the manually controlled oil cam 70 has been moved to an angular position in which the cam follower 85 is in its radially innermost position, so that the rack 35 can also occupy its most extreme position. The manually controlled gas cam 71, however, occupies an angular position in which the cam follower 87 remains in the outermost position, so that the gas regulating rack 34 remains in a corresponding zero position. Also the change-over cam 74 which is provided for switching from diesel to gas operation occupies an angular position in which no change of position of its regulating rod can occur.

In this position of the hand wheel the automatic control unit is capable of automatically adjusting the fuel regulating means up to the maximum load demand. The positions shown in Figure 6 are those for the maximum load. Starting from the zero position, the rotary slide 63 of the servomotor, with increasing load has moved through the angle α. To illustrate the operation, it is assumed that now the load demand will be somewhat reduced. This results in a small increase of the velocity of the governor, causing a lifting of the governor socket and a lowering of the control slide 57, so that pressure oil can flow from the oil inlet 58 through the conduit 60 to the chamber 62 of the servo motor and move the slide 63 in counter-clockwise direction. This rotary movement of the servo-motor shaft 64 causes the rising cam face of the oil cam 65 to move the roller 85 away from the shaft axis and initiates a closing movement of the injection pump regulating rack 35. Since the resetting cam 67 is rotated to the same extent as the cam 65, the spiral curve of the resetting cam urges the roller 91 away from the shaft center, so that the levers 92 and 93 (Fig. 8) effect in known manner a lowering and a resetting of the control bushing 94. The regulating operation accordingly is stable. Through the whole range of the graduation 0–100 "Diesel" the engine consumes exclusively liquid fuel, as shown in the fuel distribution diagram in Figure 6.

When the maximum engine output is to be limited to a certain intermediate value, the hand wheel 50 is turned in counter-clockwise direction and adjusted for example to the value HP'. This causes the manually controlled oil cam 70 to move the cam follower 85 a certain amount away from the shaft center. In this manner the cam 70 acts as a limiting cam for the range exceeding the adjusted maximum load value.

The second control diagram shown in Figure 7 refers to the combined use of liquid and gaseous fuel. Here, the hand wheel 50 has been turned further to the position "Gas." The intermediate graduation value "50" has been chosen. Compared with the diagram of Fig. 6 the hand wheel has been turned clockwise through one quarter of a revolution. The cam follower 87 makes contact with an intermediate point of the surface of the manually controlled cam 71, the cam acting as a limiting stop to prevent a further movement of the follower 87 towards the shaft center. In this manner the maximum proportion of the gaseous fuel component to be used is fixed. The cam follower 85 is now completely out of contact with the oil limiting cam 70 during the entire regulating range, and exclusively controlled by the oil cam 65.

The cam follower 87 also is completely removed from contact with the gas cam 66. When the load demand varies, for example decreases, the servo-motor slide 63 effects a counter-clockwise movement owing to an increase of the governor velocity. Accordingly, the shaft 64 moves the cam 65 in the same direction and the cam follower 85 is pushed further away from the shaft center, so that the fuel injection pump 24 delivers a smaller amount of fuel to the cylinders. In this manner, any variation in load demand exclusively effects the admission of liquid fuel, whereas the gas fuel component remains constant, because the position of the cam follower 87 is solely controlled by the manually actuated cam 71. The total regulating range of the servomotor is again designated by α. In the diagram shown on the right hand side of Figure 7 it can be seen that the gas fuel component remains constant at the adjusted absolute value, and that in the higher load range the supplemental fuel admission caused by governor impulses is taken up solely by liquid fuel. In the lower load range the gas component is also throttled automatically in response to the load decrease, whereas the liquid fuel component is maintained until idling operation, at the amount required for ignition oil.

Figure 8 represents the operation diagrams when the engine operates on gas fuel and liquid fuel is used as ignition oil only. For this purpose the hand wheel 50 is set on the graduation line 100 of the position "Gas." Compared with the position of Figure 7, the hand wheel has been moved further by one eighth of a revolution. The gas limiting cam 71 allows the cam follower 87 to move to its innermost position, whereas the oil limiting cam 70 is again out of contact with its follower 85 which is engaged by cam 65 only, this latter being controlled by the governor 48. During all variations of load this governor adjusts the cam 65 to "ignition oil." When the load demand is reduced, the servomotor slide 63 operates only in the range indicated by the angle α as shown in Figure 8. The diagram of this figure clearly shows the relation between the fuel components as a function of the load.

Finally, the manner of operation of the previously mentioned change-over cam 74 will now be explained. This change-over cam 74 is fixed to the same hollow shaft 72 as the cams 70 and 71, so that it can control the position of control 57 by means of the lever 92. In the angular position represented in Figure 8 the left hand end of the lever 92 is raised by the rise of the cam 74, and this movement is transferred to the control slide 57 so that a counter-clockwise rotation of servomotor shaft 64 and of the reset cam 67 is effected. By the provision of the reset cam it is possible to effect a relative movement of the control slide 57, which movement is not affected by the governor 48. The change-over operation can now be carried out while a constant speed of rotation of the engine is maintained.

A power indicating device 96 (Figures 1 and 3) indicates to the operator at any time the instantaneous condition of the engine admission and the proportions between the liquid and the gaseous fuels. For this purpose, the pointer 97 is coupled to the lever 41 and indicates on the scale "Oil" the degree of admission with liquid fuel. A further pointer 98 is connected to the lever 45 and indicates on the scale "Gas" the degree of admission with gaseous fuel. In the adjustment shown in Figure 1 both pointers are in the zero position according to the hand wheel 50 adjusted to the "Stop" position.

I claim:

1. Fuel control means for a dual fuel internal combustion engine operating on liquid fuel and/or on gas fuel, comprising liquid fuel and gas fuel supply means, manually settable cam means including two manually settable cams acting on said liquid fuel supply means and said gas fuel supply means respectively for adjusting the maximum proportion of the gas fuel available for a period of operation during standstill or during running of the engine, and governor controlled cam means including two governor actuated cams for acting on said liquid fuel supply means and said gas fuel supply means respectively for controlling the gas fuel admission until the preset maximum gas fuel admission is reached and upon higher engine load demands automatically effecting additional admission by delivery of liquid fuel to the engine, the manually settable cam and the governor actuated cam for the liquid fuel supply means being adjacent each other and rotatable about a common axis, and a common cam follower for said liquid fuel supply cams connected to said liquid fuel supply means, and the manually settable cam and the governor actuated cam for the gas fuel supply means being adjacent each other and rotatable about a common axis, and a common cam follower for said gas fuel supply cams connected to said gas fuel supply means.

2. Fuel control means as claimed in claim 1 in which said governor controlled cam means include a governor controlled servomotor having a rotatable shaft, said governor actuated cams being fixed on said servomotor shaft, and said manually controlled cam means include a hollow shaft concentric with said servomotor shaft, said manually settable cams fixed to said hollow shaft, and a hand wheel geared to said hollow shaft for rotating it.

3. Fuel control means as claimed in claim 2, further comprising auxiliary control cams for starting and operating of the engine mounted on said hollow shaft adapted to be turned by said hand wheel, said further cams being located between said manually settable cams.

4. Fuel control means as claimed in claim 3, in which said liquid fuel supply means comprises a liquid fuel pump having a stroke regulating member, said cam follower for said liquid fuel supply cams being operatively connected with said stroke regulating member, and said gas fuel supply means comprises a gas inlet valve and a hydraulic pump for actuating said inlet valve, said hydraulic pump having a stroke regulating member, said common cam follower for said gas fuel supply cams being operatively connected with the stroke regulating member of said pump actuating the gas inlet valve.

5. Fuel control means as claimed in claim 4 in which said liquid fuel pump and said gas inlet valve actuating pump each has a pump plunger with an inclined edge, the pumps for each engine cylinder being disposed in a common housing having an inlet opening therein cooperating with said inclined edges.

6. Fuel control means as claimed in claim 1 in which said gas fuel supply means comprises a mixing device for air and gas formed as concentric ejector having an inner air nozzle.

References Cited in the file of this patent

UNITED STATES PATENTS

| | | |
|---|---|---|
| 2,400,219 | Barnaby et al. | May 14, 1946 |
| 2,400,247 | Miller et al. | May 14, 1946 |
| 2,696,807 | Junge et al. | Dec. 14, 1954 |
| 2,739,577 | Moulton | Mar. 27, 1956 |

FOREIGN PATENTS

| | | |
|---|---|---|
| 877,398 | France | Sept. 7, 1942 |